United States Patent [19]

Bulan et al.

[11] Patent Number: 5,411,726

[45] Date of Patent: May 2, 1995

[54] PROCESS FOR PURIFYING HYDROGEN FLUORIDE

[75] Inventors: Andreas Bulan, Langenfeld; Rainer Weber, Odenthal; Hans-Dieter Block; Hans-Heinrich Moretto, both of Leverkusen, all of Germany

[73] Assignee: Bayer AG, Leverkusen, Germany

[21] Appl. No.: 188,683

[22] Filed: Jan. 31, 1994

[30] Foreign Application Priority Data

Feb. 10, 1993 [DE] Germany .................... 43 03 837.9

[51] Int. Cl.$^6$ ................................................. C01B 7/19
[52] U.S. Cl. ..................................... 423/484; 423/488; 423/489; 204/101
[58] Field of Search ............... 423/484, 485, 488, 489; 204/101

[56] References Cited

U.S. PATENT DOCUMENTS

| | | | |
|---|---|---|---|
| 3,166,379 | 1/1965 | Bradley et al. | 423/481 |
| 3,276,981 | 10/1966 | Donohue et al. | 204/101 |
| 3,414,495 | 12/1968 | Donohue | 423/489 |
| 4,032,621 | 6/1977 | Meadows | 423/488 |
| 4,668,497 | 5/1987 | Miki | 423/488 |
| 5,100,639 | 3/1992 | Freire et al. | 423/484 |
| 5,164,052 | 11/1992 | Bulan et al. | 204/130 |

FOREIGN PATENT DOCUMENTS

| | | | |
|---|---|---|---|
| 539892 | 3/1993 | European Pat. Off. | 423/484 |
| 539893 | 3/1993 | European Pat. Off. | 423/484 |
| 254372 | 2/1988 | German Dem. Rep. | 423/484 |
| 2026917 | 12/1971 | Germany | 423/489 |
| 979271 | 12/1982 | U.S.S.R. | 423/488 |
| WO91/13024 | 9/1991 | WIPO. | |

OTHER PUBLICATIONS

Hass et al., "On the formation . . . water-containing HF", Z. Anorg., Allg. Chem., vol. 463, QD 1 Z4, pp. 91–95 (1980) (no month).

Weast, "Handbook of Chemistry and Physics", 57th edition, 1977, pp. D-185 (no month).

J. A. Donohue and A. Zletz, "Pulsed Electrolysis of Wet Hydrogen Fluoride", J. Electrochem. Society, vol. 115, No. 10, pp. 1039–1042 (1968).

Primary Examiner—Wayne Langel
Assistant Examiner—N. M. Nguyen
Attorney, Agent, or Firm—Connolly & Hutz

[57] ABSTRACT

The invention relates to a process for purifying industrial anhydrous hydrogen fluoride by means of oxygen difluoride.

13 Claims, No Drawings

PROCESS FOR PURIFYING HYDROGEN FLUORIDE

BACKGROUND OF THE INVENTION

The invention relates to a process for purifying anhydrous industrial hydrogen fluoride.

Industrially manufactured hydrogen fluoride ($CaF_2 + H_2SO_4 \rightarrow 2\ HF + CaSO_4$) generally occurs as anhydrous hydrogen fluoride, which contains some impurities and small amounts of water, depending on the starting material (normally fluorspar).

The term "anhydrous hydrogen fluoride" is thus understood to mean a hydrogen fluoride as obtained by a conventional industrial process and having a water content of less than 5,000 mg of water/kg of hydrogen fluoride.

The impurities are substantially compounds of the elements arsenic, phosphorus, boron, silicon and sulphur.

These compounds cause problems in many applications, and are therefore undesirable.

When aqueous hydrogen fluoride solutions are utilised in the manufacture of electronic components, the compounds of the elements arsenic, phosphorus, silicon and boron, particularly, cause problems.

In applications in which hydrogen fluoride and a catalyst are utilised, for example in the manufacture of fluorocarbons—substances which replace chlorofluorocarbons—it is the sulphur compounds which particularly give rise to problems.

In U.S. Pat. No. 3,166,379 compounds of the elements arsenic, phosphorus and sulphur are removed by adding chlorine, bromine or iodine, followed by distillation of the hydrogen fluoride.

In U.S. Pat. No. 4,668,497 compounds of the elements boron, silicon, phosphorus, sulphur, chlorine and arsenic are removed by adding elemental fluorine, followed by distillation of the hydrogen fluoride.

In U.S. Pat. No. 4,032,621 compounds of the elements arsenic and sulphur are removed by adding permanganates or dichromates, followed by distillation of the hydrogen fluoride.

The disadvantage of the aforementioned processes is that the addition of oxidants, with the exception of fluorine, to the industrial hydrogen fluoride adds to the hydrogen fluoride an impurity not previously contained in it. Following the oxidation, the hydrogen fluoride must therefore be distilled in order to separate the oxidant and the oxidised impurities.

A disadvantage of using fluorine is that it entails handling problems.

Depending on the oxidant added, a reducing agent must moreover be added before distillation in order to destroy the excess oxidant (U.S. Pat. No. 4,032,621), thus drawing further impurities into the hydrogen fluoride.

In DE-A 4 031 967 and WO 91/13024 the hydrogen fluoride is purified by electrolysis on nickel or carbon electrodes. The disadvantage of these processes is that carbon electrodes have proved to be not particularly suitable because of their short service life in hydrogen fluoride electrolysis. The disadvantage of utilising nickel electrodes is the occurrence of severe electrode corrosion. This introduces nickel compounds as impurities into the hydrogen fluoride to be treated.

The object of the invention was therefore to provide a process for purifying anhydrous industrial hydrogen fluoride which does not have the disadvantages mentioned.

SUMMARY OF THE INVENTION

The process according to the invention was surprisingly able to achieve this object.

The present invention provides for a process for purifying industrial anhydrous hydrogen fluoride, characterised in that oxygen difluoride is added to the hydrogen fluoride.

The process according to the invention may be carried out such that oxygen difluoride is introduced directly into the industrial anhydrous hydrogen fluoride to be purified.

Equally, the oxygen difluoride can be firstly prepared by electrolysis from an aqueous hydrogen fluoride solution at nickel electrodes and then be introduced into the hydrogen fluoride to be purified (see HASS, WOLTER, Z. anorg. allg. Chem. 463, 91–95 (1980) for electrolytic preparation of oxygen difluoride). The oxygen difluoride can be prepared electrolytically for example in a divided cell. When oxygen difluoride is prepared from an aqueous hydrogen fluoride solution using nickel electrodes, very slight electrode corrosion is observed.

Oxygen difluoride may be introduced into the hydrogen fluoride to be purified, either undiluted or in mixtures with inert gases such as e.g. nitrogen or hydrogen fluoride gas.

Oxygen difluoride dissolved in an inert liquid may also be added to the hydrogen fluoride to be purified. Hydrogen fluoride is an example of an inert liquid which may be used.

DESCRIPTION OF THE PREFERRED EMBODIMENTS

It is advantageous for carrying out the process according to the invention for the oxygen difluoride to be well mixed with the hydrogen fluoride to be purified. This can be achieved for example by introducing the oxygen difluoride into the hydrogen fluoride to be purified over a frit or by forming it directly in the hydrogen fluoride to be purified. Mixers may equally be employed which are capable of distributing gases thoroughly in liquids.

The hydrogen fluoride to be purified can also be contacted in the gas phase with oxygen difluoride at temperatures of from 20° to 200° C. and at atmospheric pressure. Alternatively, the hydrogen fluoride to be purified can contacted in the gas phase with oxygen difluoride at pressures below one atmosphere.

It is equally possible to carry out the process according to the invention at elevated pressure (i.e., pressures above one atmosphere) in pressure vessels.

The advantage of the process according to the invention resides in the fact that oxygen difluoride does not introduce additional impurity into the hydrogen fluoride to be purified. Distillation is not necessary.

A further advantage of the process according to the invention is that, being less reactive than fluorine, oxygen difluoride permits of substantially easier handling.

The process according to the invention is explained in greater detail with the aid of the Examples which follow.

EXAMPLES

Oxygen difluoride was prepared electrolytically from an aqueous hydrogen fluoride solution at nickel electrodes for the experiments.

For this purpose an electrolytic cell having a volume of 1,500 ml was filled with a 98%-concentration hydrofluoric acid. By applying a voltage of approx. 5 V and at a current of 1 A, generation then took place at nickel electrodes. The oxygen difluoride which formed was introduced in a 30 l/h nitrogen stream into the hydrogen fluoride to be purified.

Example 1 (process according to the invention)

The hydrogen fluoride to be purified contained a concentration of 22 ppm arsenic in the form of arsenic compounds. 650 ml of this hydrogen fluoride were filled into a vessel. A gas stream of nitrogen and oxygen difluoride was introduced into the hydrogen fluoride to be purified for a period of 27 hours. The gas stream was prepared as described above.

The arsenic content at the end of the test was around 4.95 ppm. 77.5% of the arsenic was removed.

Example 2 (influence of oxygen and ozone)

When an aqueous hydrogen fluoride solution is electrolysed oxygen and ozone are formed at the anode in addition to oxygen difluoride. In order to investigate the influence of oxygen and ozone on purification of industrial anhydrous hydrogen fluoride, a mixture of oxygen and ozone was blown into the hydrogen fluoride to be purified. 650 ml of this hydrogen fluoride having an arsenic content of 35 mg of arsenic/kg of hydrogen fluoride were placed in a reaction vessel, and a mixture of 15 g of ozone and 400 g of oxygen was blown in over a period of 3 hours. The contents of the reaction vessel were then examined. The arsenic content was unchanged.

What is claimed is:

1. Process for purifying anhydrous hydrogen fluoride which contains water in an amount of less than 5,000 mg of water per kilogram of hydrogen fluoride and at least one other impurity selected from the group consisting of compounds of the elements arsenic, phosphorus, boron, silicon and sulphur, wherein said process consists essentially of removing at least a portion of said at least one impurity from said hydrogen fluoride by introducing oxygen difluoride, in undiluted form, directly into the hydrogen fluoride at temperatures of between 20° and 200° C., and wherein the oxygen difluoride is produced in a separate step before it is introduced into said hydrogen fluoride.

2. Process according to claim 1, wherein both said hydrogen fluoride and said oxygen difluoride are gases and purification takes place in the gas phase at atmospheric pressure.

3. Process according to claim 1, wherein the purification takes place at pressures above one atmosphere.

4. Process according to claim 1, wherein the purification takes place at pressures below one atmosphere.

5. Process for purifying anhydrous hydrogen fluoride which contains water in an amount of less than 5,000 mg of water per kilogram of hydrogen fluoride and at least one other impurity selected from the group consisting of compounds of the elements arsenic, phosphorus, boron, silicon and sulphur, wherein said process consists essentially of removing at least a portion of said at least one impurity from said hydrogen fluoride by introducing a mixture of oxygen difluoride and at least one inert gas or inert liquid directly into the hydrogen fluoride at temperatures of between 20° and 200° C., and wherein the oxygen difluoride is produced in a separate step before it is mixed with the at least one inert gas or inert liquid.

6. Process according to claim 5, wherein said inert gas is nitrogen or hydrogen fluoride gas.

7. Process according to claim 5, wherein said inert liquid is hydrogen fluoride.

8. Process according to claim 5, wherein the purification takes place at pressures above one atmosphere.

9. Process according to claim 5, wherein the purification takes place at pressures below one atmosphere.

10. Process according to claim 1, wherein at least 77.5% of the at least one impurity is removed from the anhydrous hydrogen fluoride.

11. Process for purifying anhydrous hydrogen fluoride which contains water in an amount of less than 5,000 mg of water per kilogram of hydrogen fluoride and at least one other impurity selected from the group consisting of compounds of the elements arsenic, phosphorus, boron, silicon and sulphur, wherein said process comprises removing at least a portion of said at least one impurity from said gaseous hydrogen fluoride by introducing oxygen difluoride, either in undiluted form or mixed with at least one inert gas or inert liquid, directly into the hydrogen fluoride at temperatures of between 20° and 200° C. and further wherein both said hydrogen fluoride and said oxygen difluoride are gases.

12. Process according to claim 1, wherein the final hydrogen fluoride that is produced after the purification is not subjected to a distillation step.

13. Process according to claim 5, wherein the final hydrogen fluoride that is produced after the purification is not subjected to a distillation step.

* * * * *